(No Model.) 2 Sheets—Sheet 1.

J. B. WILSON.
CLAMP FOR HOLDING BOTTLES.

No. 294,946. Patented Mar. 11, 1884.

WITNESSES:
A. E. Paige
Linn Wheeler

INVENTOR
Joseph B Wilson
by his atty
S. Lloyd Wiegand (No Model.) 2 Sheets—Sheet 2.

J. B. WILSON.
CLAMP FOR HOLDING BOTTLES.

No. 294,946. Patented Mar. 11, 1884.

WITNESSES:
A. E. Paige
Linn Wheeler

INVENTOR
Joseph B Wilson
by his Atty.
Lloyd Wiegand

UNITED STATES PATENT OFFICE.

JOSEPH B. WILSON, OF CLAYTON, NEW JERSEY, ASSIGNOR OF ONE-HALF TO JOSEPH WHARTON, OF PHILADELPHIA, PENNSYLVANIA.

CLAMP FOR HOLDING BOTTLES.

SPECIFICATION forming part of Letters Patent No. 294,946, dated March 11, 1884.

Application filed November 15, 1883. (No model.)

*To all whom it may concern:*

Be it known that I, JOSEPH BAREFORD WILSON, a citizen of the United States, residing at Clayton, in the county of Gloucester and State of New Jersey, have invented certain new and useful Improvements in Clamps for Holding Bottles; and I do hereby declare the following to be a sufficiently full, clear, and exact description thereof to enable others skilled in the art to make and use the said invention.

This invention relates to the clamps or implement used to hold bottles during the operation of forming and finishing the necks and lips thereof, and has for its object the facility of adjustment to different sizes and forms of bottles, a greater durability than has hitherto been attainable in adjustable clamps or holders, and a lightening of the tool, relieving the operator of unnecessary weight, and the production of the tools at a diminished cost.

The nature of this invention consists in a series of parallel fluted or corrugated jaws attached to a plate or cross at the end of a shank or handle, so that they may each be separately adjusted radially on said plate or cross, and secured thereto, so as to adapt them to different diameters and shapes of vials, and combined with an adjustable table or base for resting the bottoms of the vials against, so as to adapt the clamp to the support and holding of vials of different lengths with the least practicable conduction of heat from the bottle to the holding implement, and with greater firmness than has heretofore been attained in adjustable bottle-holding clamps.

The particular mode of making and operating this invention is shown in the accompanying drawings, in which—

Figure 1:
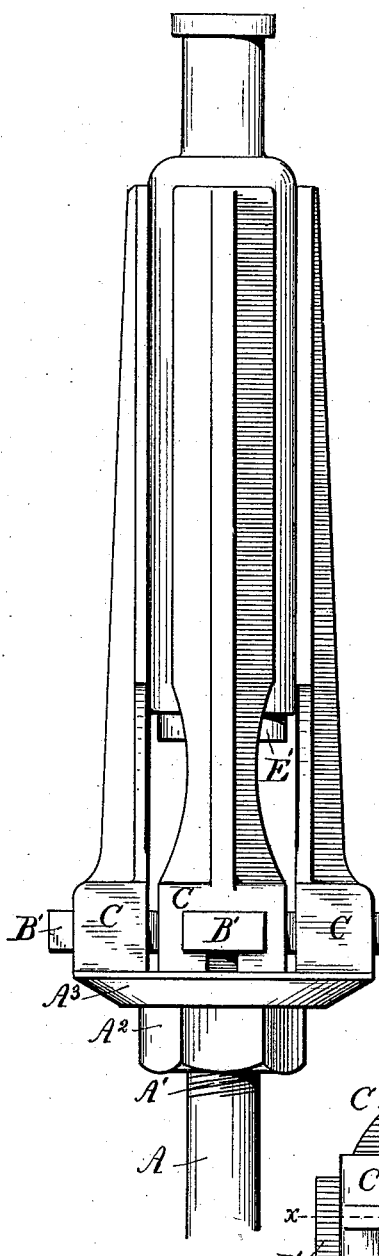
Figure 2:
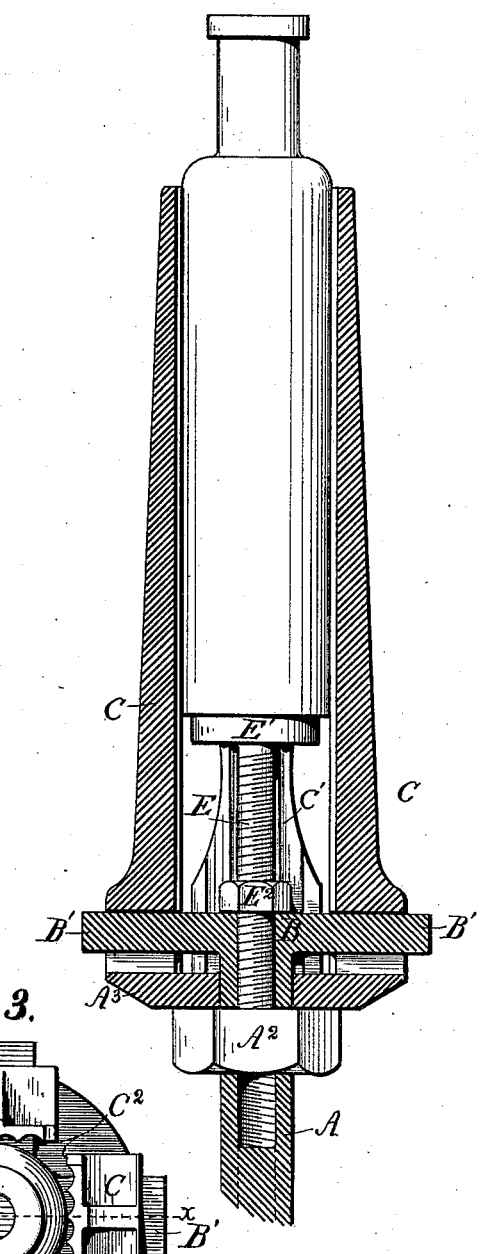
Figure 3:
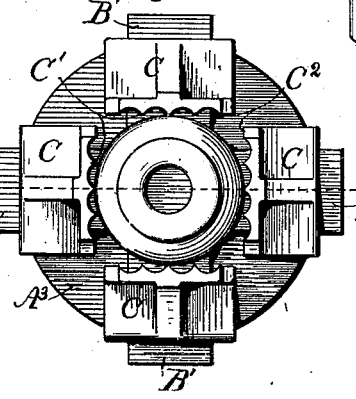
Figure 4:
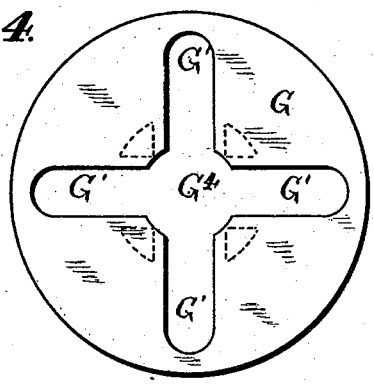
Figure 5:
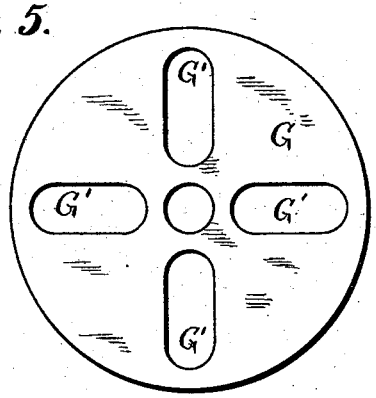
Figure 6:
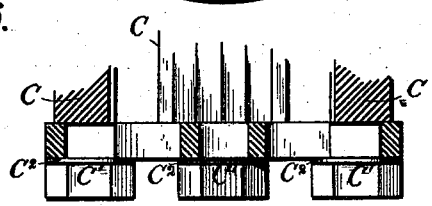
Figure 7:
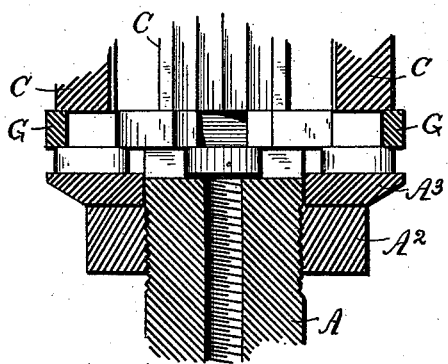

Figure 1 shows an elevation of the tool; Fig. 2, a section thereof in the plane indicated by the line $xx$ in Fig. 3; Fig. 3, a plan or end view of the form shown in Fig. 1. Figs. 4 and 5 show in end view modified details of the tool; and Figs. 6 and 7 show vertical sections of parts of the tool, made in modified form.

The same letters of reference apply to the same parts in the several figures.

A is a shaft or shank of the tool, formed preferably, of a cylindric tube, upon the end of it, as shown in Figs. 1, 2, and 3. At right angles to the axis of the shaft A is formed a cross, B, of four radiating arms, B', which are rectangular in cross-section, and are finished accurately parallel upon both sides and edges. Upon the arms B' are fitted jaws C, so as to slide toward and from the center of the cross. The jaws C are made with longitudinal flutes or ridges C' upon their inner faces, $C^2$, and are exactly parallel with each other. Upon the shaft A, below the cross B, is a screw-thread, A', upon which fits a nut, $A^2$, resting against a washer, $A^3$, bearing equally against the under sides of each of the jaws C, which jaws C are upon that surface dressed accurately flat and of the same thickness from the under side of the cross B. In the center of the cross B is a hole, screw-threaded, so as to fit a screw, E, having a flat head, E', adapted to bear on the bottom of a bottle, and upon the screw E is a lock-nut, whereby the screw may be secured in any desired longitudinal adjustment, so as to adapt the clamp to bottles of different lengths.

In using the clamp, it is adjusted by turning the screw E so that the shoulder of a bottle resting with its bottom on the screw-head E will be above the ends of the jaws C, and the lock-nut $E^2$ is then turned until it presses tightly on the cross B. The several jaws C are then placed against the sides of the bottle while in central position with the screw E and shank A, and the nut $A^2$ is turned on the screw A' so as to press the washer $A^3$ against the jaws C, which are thus clamped securely between the arms B' of the cross B and the washer $A^3$. Bottles placed in the clamp are heated and rotated by rolling the shaft A, and the necks and lips formed by the application of the usual tools. By reason of the jaws C being ridged or fluted, they do not come into such intimate contact with the sides of the bottles and conduct less heat therefrom, thus saving the jaws C from wear and the bottle from injury by rapid cooling.

In the form shown in Figs. 4, 5, 6, and 7, instead of a cross, B, having arms B', embraced by portions of the jaws C, a slotted plate, G, is substituted, and the jaws C pass through the slots G' formed therein, as shown in Figs. 4 and 7. The jaws C are clamped by the washer $A^3$ and nut $A^2$, the jaws being introduced through a central aperture, $G^4$, before the screw E is introduced. In the form shown in Figs.

5 and 6 each jaw C is clamped separately by a nut, C', and washer C². These two modifications are advantageous and desirable, by reason of the surfaces involved in the adjustments being more cheaply and readily finished by machine-tools than the cross B and arms B' and the portions of the jaws fitting thereon, as shown in the first three figures of the drawings.

I am aware that adjustable bottle-holding implements have been made wherein radially-adjustable jaws, curved inwardly toward their extremities, were employed in combination with a table, pressed by the reaction of a spring against the bottom of a bottle, which was thereby forced between the converging ends of the jaws. Such holders have no greater power of resistance to the end-pressure employed in forming the bottle-lips than the force of the spring, and the application of such pressure tends to release the hold of the jaws upon the bottle, and permits it to turn in the clamp—an objectionable feature avoided by my invention, while at the same time I provide an adjustment of the clamp or holder to bottles of different lengths, and a rigid unyielding support to the bottom of the bottle, and at the same time a diametral adjustment, whereby the same clamp may be applied to bottles of different diameters and caused to hold the same so that they will rotate therewith in the operation of finishing the neck and top; and although so securely held the conduction of heat from the bottle to the clamp is avoided, and the grip of the jaws upon the bottle for the purpose of rotating it is improved by fluting the jaws, and the ready disengagement of the bottles when finished facilitated by the parallel ridges between the flutes of the jaws, being the only parts in contact with the sides of the bottles.

I do not claim either the adjustable parallel jaws by themselves; neither do I claim the adjustable table by itself; neither do I claim, broadly, the combination of parallel jaws with a plate having radial slots wherein such jaws are diametrally adjustable; but

What I claim is—

1. An improved implement for holding bottles while finishing the necks thereof, consisting of a hollow central shaft provided with radiating guides upon the end thereof, bearing parallel fluted jaws radially adjustable thereon, in combination with a table adapted to support the bottom of the bottle, and having a screwed stem fitting adjustably in a corresponding nut formed in the said hollow central shaft, substantially as and for the purpose set forth.

2. In an implement for holding bottles while finishing the necks thereof, a hollow central shaft internally screw-threaded, and provided with a screw fitting adjustably as to length therein, and bearing a table adapted to support the bottom of a bottle, in combination with radial guides projecting from the said hollow shaft below said table, and bearing parallel jaws radially adjustable upon said guides, substantially as and for the purpose set forth.

JOSEPH B. WILSON.

Witnesses:
J. DANIEL EBY,
LINN WHEELER.